United States Patent
Codrino

[11] 3,758,189
[45] Sept. 11, 1973

[54] METAL CABLE TERMINAL FOR LIGHT GUIDING CABLE

[76] Inventor: Giuseppe Codrino, Via Stazione, Quattordio, Alessandria, Italy

[22] Filed: Nov. 9, 1971

[21] Appl. No.: 197,061

[52] U.S. Cl. .............................................. 350/96 B
[51] Int. Cl. ............................................. G02b 5/16
[58] Field of Search ............................... 350/96 B

[56] References Cited
UNITED STATES PATENTS

| | | |
|---|---|---|
| 3,655,275 | 4/1972 | Seagraves ..................... 350/96 B X |
| 3,504,984 | 4/1970 | Bush ............................. 350/96 B X |
| 3,649,098 | 3/1972 | Suverison ..................... 350/96 B |
| 3,638,008 | 1/1972 | Keller et al. ................... 350/96 B X |
| 3,423,581 | 1/1969 | Baer ............................. 350/96 B X |
| 3,510,641 | 5/1970 | Reynolds ...................... 350/96 B X |
| 3,538,321 | 11/1970 | Longenecker et al. ........ 350/96 B X |

*Primary Examiner*—David H. Rubin
*Attorney*—Michael S. Striker

[57] ABSTRACT

A metal cable terminal for light guiding cable, particularly adapted for application to a light diffuser, provided with one or more attachment members.

5 Claims, 6 Drawing Figures

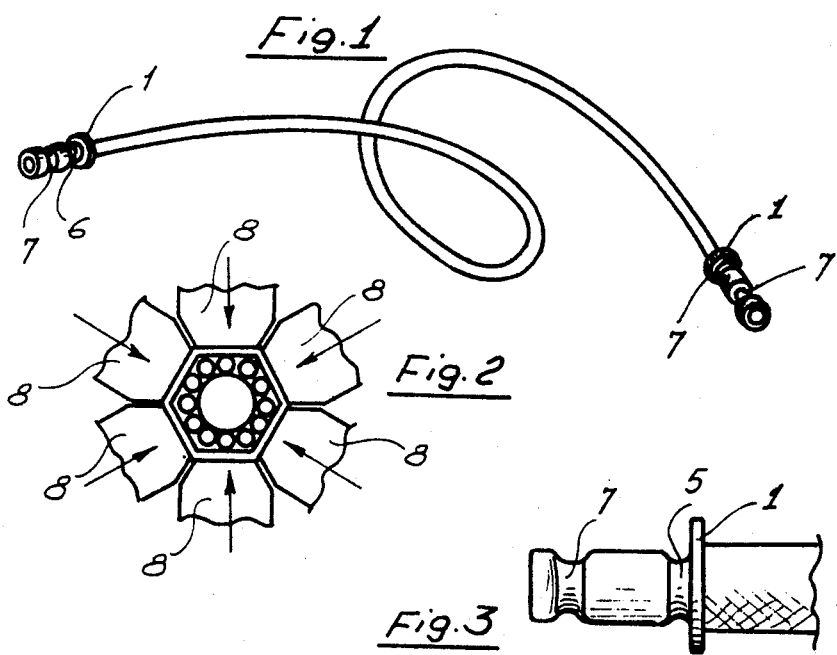
Fig. 1
Fig. 2
Fig. 3
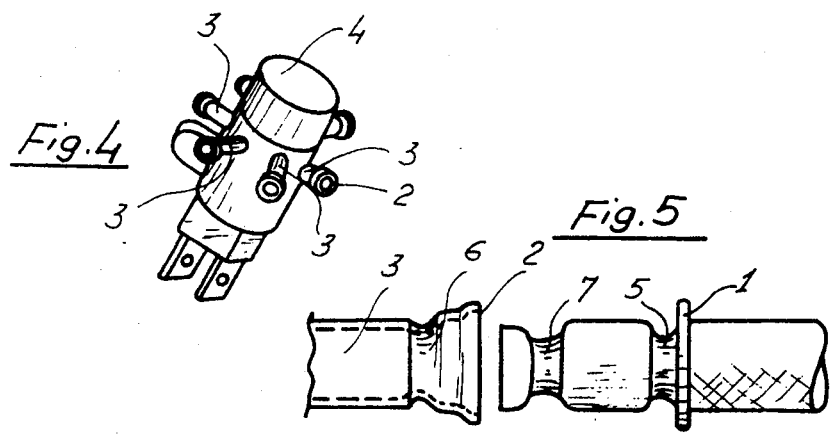
Fig. 4
Fig. 5
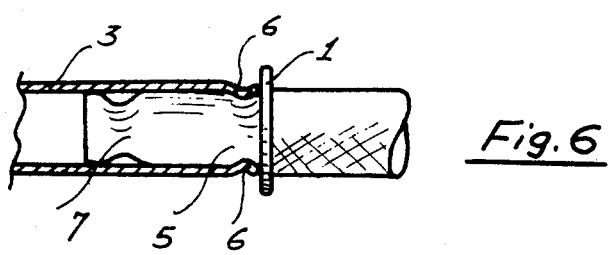
Fig. 6

METAL CABLE TERMINAL FOR LIGHT GUIDING CABLE

This invention relates to a metal cable terminal for light guiding cable, particularly adapted for application to a light diffuser, provided with one or more attachment members.

As it is well known, the light guiding cables consist of a series of glass filaments, covered with a plastic material sheath, such for example as polyvinyl chloride.

They are being used for transmitting the light from a luminous source to an element to be lighted.

For this reason, said cables are provided with a cable terminal, which ensures their fitting to the light diffuser, in which the luminous source is contained.

The cable terminal, besides ensuring an easy and smoth connection and disconnection of the cable to and from the light diffuser, should provide a perfect tightness thereof and prevent any light diffusion.

The cable terminal according to the present invention permits thanks to its constructional features to perfectly attain said objects by carrying out a suitable fastening of the filaments, constituting the cable and ensuring a perfect and easy connection of the light guiding cable to the attachment member or members of the light diffuser, in which the luminous source is contained.

The cable terminal according to this invention ensures further a complete and perfect transmission of the amount of light emitted by the luminous source to the element to be lighted, without thereby causing losses or diffusions.

Furthermore, on account of its constructional and functional features, the cable terminal in conformity with this invention lends itself preferably to be fitted to the light guiding cables, lighting the instruments and various auxiliary controls, arranged on the instrument panel of motor cars, ships, aircrafts and other vehicles.

These and further features of a functional and constructional nature of the cable terminal according to this invention could better be understood from the followin detailed description and the various figures on the accompanying drawing, representing a preferred but non limiting embodiment form of the invention, in which:

FIG. 1 shows a perspective view of a light guiding calbe, provided at its both ends with two cable terminals being the subject of this invention;

FIG. 2 represents a schematical view of the cross section of a cable terminal having a polygonal section;

FIG. 3 shows a side view of a metal cable terminal having a circular section;

FIG. 4 represents a perspective of a diffuser, provided with more attachment members for light guiding cables;

FIG. 5 shows a schematical view and perspective representation of a calbe terminal of a light guiding cable and an attachment member of a diffuser and FIG. 6 is a sectional side view of a cable terminal, inserted into an attachment member of a diffuser.

Referring now the the drawing, the cable terminal according to this invention consists of a flange 1, designed to abut against the edge 2 of the attachment member 3 of a light diffuser 4, when the light guiding cable is inserted, and a perimetrical groove 5 arranged in vicinity of the flange 1.

The latter, when the light guiding cable is inserted, fits into the perimetrical constriction 6 with which attachment member 3 is provided, thereby ensuring a suitable fastening of the terminal to the diffuser 4.

In order to ensure a perfect tightness of the filaments constituting the cable, the terminal according to this invention is provided at its end with a further perimetrical groove 7 which, by tightening the cable, prevents the sliding of the filaments relative to each other.

It is preferred that the width of the cable terminal be equal to the one of the inside diameter of the attachment member of the diffuser so as to ensure a perfect and complete lighting of the ends of all cable filaments.

In order to attain such object further, once the cable has been inserted into the cable terminal and after the latter has been fastened, the cable is being cut at the end of the cable terminal and the cut surface is being subjected to a polishing operation by suitable means.

The cable terminal according to this invention may be made from any metal or metal alloy, such for example as steel, copper or other metals or alloys and may be of any shape whatsoever.

Thus for example it may be made so as to show a polygonal section by using independent multiple tools 8 as shown in FIG. 2 or a circular section as depicted in FIG. 3.

Depending on its shape, the cable terminal according to this invention may be clamped to the cable or rolled on by means of a swaging machine.

By such last constructional arrangement it is possible to obtain a finer calibration of the cable terminal thickness.

The metal cable terminal according to this invention has been described in the foregoing specification by way of non-limiting example.

Consequently, various changes and modifications could be introduced in its shape and construction, without thereby departing from the scope of the invention.

I claim:

1. In an arrangement for connecting a light guiding cable to a light diffuser, a cable terminal for a light guiding cable comprising a plurality of light guiding filaments, said terminal comprising in combination a male coupling member including a metal sleeve surrounding an end portion of the cable and having an annular flange at one end located spaced from the free end of the cable, a first annular groove in said sleeve adjacent said flange and a second annular groove adjacent the other end of the sleeve and tightly engaging the filaments of the cable; and at least one female coupling member connected to said light diffuser and having an end edge for engagement with said flange of said male coupling member and an annular constriction for lodging in said first annular groove of said male coupling member when connected thereto.

2. An arrangement as defined in claim 1, wherein said sleeve has a polygonal cross section.

3. An arrangement as defined in claim 1, wherein said sleeve has a circular cross section.

4. An arrangement as defined in claim 1, wherein said light guiding cable has a polished end face.

5. An arrangement as defined in claim 1, wherein said light diffuser is provided with a plurality of female coupling members projecting circumferentially spaced from each other and in substantial radial direction therefrom.

* * * * *